Jan. 25, 1938.   K. SCHWARTZWALDER ET AL   2,106,578
SEALING COMPOSITION, METHOD OF USING SAME, AND ARTICLES MADE THEREWITH
Filed May 4, 1936

Inventors
Karl Schwartzwalder &
William Shuford Kirk
By Blackmore, Spencer & Flint
Attorneys Patented Jan. 25, 1938

2,106,578

UNITED STATES PATENT OFFICE 2,106,578

SEALING COMPOSITION, METHOD OF USING SAME, AND ARTICLES MADE THEREWITH

Karl Schwartzwalder and William Shuford Kirk, Flint, Mich., assignors to General Motors Corporation, Detroit, Mich., a corporation of Delaware Application May 4, 1936, Serial No. 77,674

14 Claims. (Cl. 123—169)

This invention has to do with a material adapted for use to unite articles made of ceramic material or to unite articles of such material with metal. The material has been specially developed for use in securing the center wire of spark plugs in the bore of the insulator, the latter usually being made of porcelain alumina or other ceramic material.

The invention also has to do with articles, especially spark plugs, made with the aid of the described material.

Heretofore it has been customary to cement the center wires of spark plugs in place in the insulators with materials such as ground quartz or finely divided calcined clay with sodium silicate as a binder or to pack loose materials about the center wire, for example, talc. In either case it has been found that leakage frequently develops between the insulator and center wire, particularly after long periods of use.

Our sealing material consists of a mixture of glass and a filler, preferably one that possesses electrical conducting properties so as to permit passage of current therethrough. We have had especial success with a mixture of glass and graphite with or without metal additions. We have found it desirable to employ a glass having a low coefficient of expansion such as magnesium borate, and in some cases have found it desirable to employ a mixture of such glass with borosilicate glass, this addition being desirable to reduce solubility in water.

The material may be used in place of the usual cement to secure one piece center wires in place in the insulator or it may be used with two-piece center wires, and in this case the material is preferably interposed between the portions of the center wire, the conducting material in the glass serving to carry the current from one center wire section to the other.

While our invention includes within its scope the use of the sealing material in fused condition, we have found it preferable to prepare the material from powdered components and to assemble a pellet of the material in the insulator bore along with the electrode. The assembly is then heated in a suitable furnace to a temperature sufficient to melt the pellet whereupon one of the center wire sections may be advanced into the bore of the insulator to cause the molten glass to be forced into the space between the center wire and the bore. The molten sealing material forms a ceramic bond with the material of the insulator, and also makes intimate contact with the metal of the center wire so that, upon cooling, the center wire and insulator are secured together in a firm union that is impervious to gases.

Figure 1:
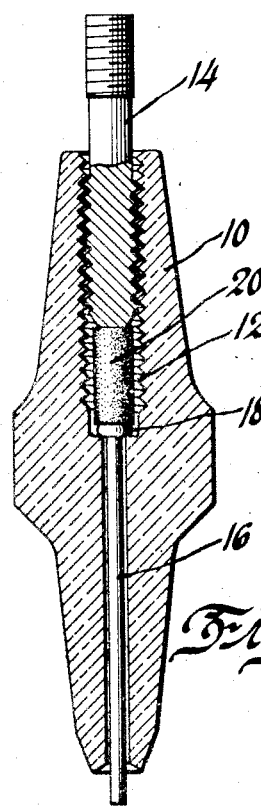
Figure 1 is a section through a spark plug insulator assembly provided with a two-part center electrode showing the parts as they are assembled prior to sealing.
Figure 2:
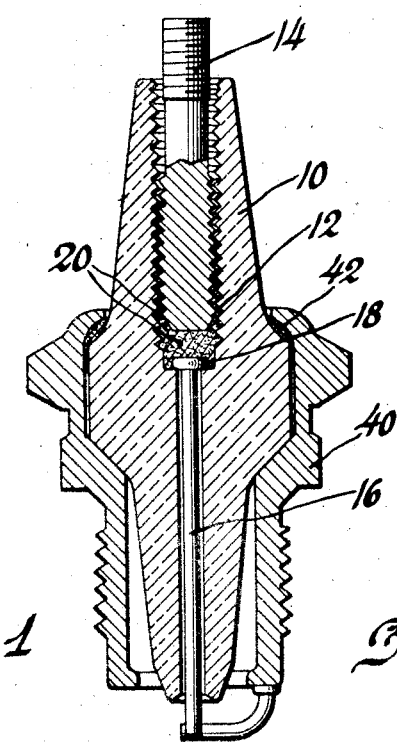
Figure 2 is a section through the same insulator assembly showing the parts after sealing, and also showing the insulator secured in the shell with the aid of the same material.

In each of the views 10 indicates a spark plug insulator made of porcelain, alumina, or other suitable material. The insulator is provided with a central bore 12, the upper portion of which is preferably threaded to receive the threaded part of the central electrode. In Figures 1 and 2 the central electrode preferably consists of an upper portion 14 threaded in the bore as shown and a lower portion 16 having a flange 18 adapted to rest on a shoulder provided at the bottom enlarged portion of the bore. The portion 16 of the electrode is preferably made of a suitable heat resisting alloy.

20 indicates a pellet of the sealing material which is assembled in the bore as shown in Figure 1 prior to the insertion of the electrode portion 14.

The sealing material 20 preferably consists of a suitable ceramic material, such as glass, melting at a temperature sufficiently low to prevent injury to the electrode material or the insulator. We have found glass to be preferable for this purpose, and especially glass having a low coefficient of expansion, such as magnesium borate glass. To reduce the solubility of the material in water it may be desirable to employ a proportion of boro-silicate glass which is likewise characterized by low coefficient of expansion. The glass is first reduced to a powder capable of passing about 150 mesh and is intimately mixed with a filler preferably consisting of graphite with or without additions of metals, or metallic compounds such as carbides, nitrides, etc. The powdered materials are formed ino pellets under pressure with or without the aid of a suitable binder.

The assembly as shown in Figure 1 is next heated in a suitable furnace to a temperature preferably on the order of 650° C. sufficient to fuse or soften the pellet 20 and thereafter the electrode section 14 is screwed down into the bore to an extent sufficient to cause the sealing material to work its way in between the upper electrode section and the insulator bore. An examination of the finished insulators after cooling shows that the sealing material has formed an intimate ceramic bond with the material of the insulator and has also entered into tight gripping engagement with the metal of the electrode. It is also noted that the glass is free from the usual crazing which would normally occur where glass is employed without the filler. While we do not wish to be limited to any particular theory as to why crazing does not occur, it is apparent that the interspersing of glass with graphite or other filler may provide opportunity for expansion of the glass without the usual cracking.

In the construction of the plug illustrated in Figures 1 and 2 the graphite in the sealing material provides a satisfactory conducting path to carry the high tension current from one section of the electrode to the other. The seal obtained is compression-tight in service, where it is subjected to pressures of the order of 100 pounds per square inch, and the sealing material grips the electrode sections so tightly that there is no possibility of the electrode becoming loose.

Figure 3:
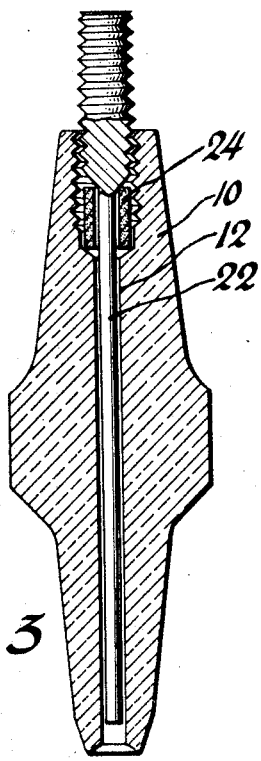
Figure 3 is a similar section showing the parts of an insulator assembly equipped with a one-piece electrode prior to sealing.

In the modification shown in Figure 3 the electrode is of a single piece as indicated at 22, and as shown in Figure 3, the pellet 24 is annular so as to permit it to be assembled on the electrode. The manner of assembly is the same as that described in connection with the previous form. However, in this modification it is to be noted that some of the sealing material is forced into the reduced portion of the insulator bore upon screwing down the electrode.

Figure 5:
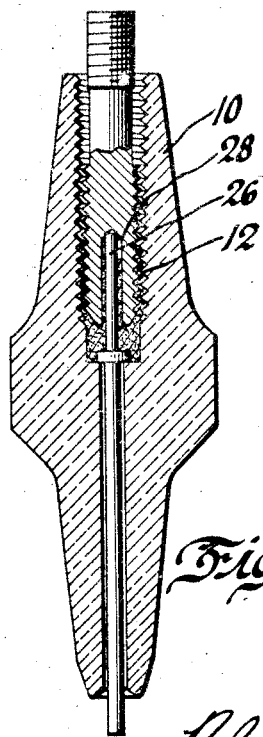
Figures 5 and 6 show modified arrangements employing two-piece electrodes.

Figure 5 shows a modification of the construction of Figure 2 in that the lower electrode section is provided with a pilot 26 received in a bore 28 formed in the upper electrode section.

Figure 4:
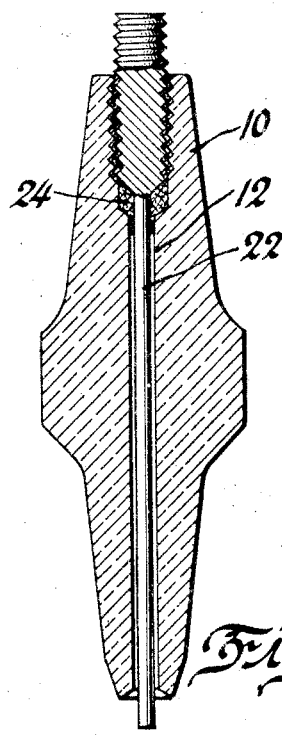
Figure 4 is a similar view of the same insulator assembly after sealing.
Figure 6:
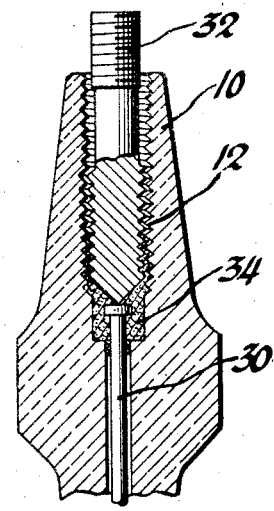

In the modification shown in Figure 6 the lower electrode section 30 is held in engagement with the upper electrode section 32 by a body of cement indicated at 34. This may be accomplished by employing an annular pellet as in the form shown in Figures 3 and 4.

The composition of the sealing material may be varied considerably. We have had especial success employing a glass made by melting a mixture of 95% $B_2O_3$, added as boric acid, and 5% MgO. The resultant glass is preferably air quenched to facilitate grinding and is then reduced to a powder and mixed with an equal amount of flake graphite, preferably that known on the market as flake Madagascar or Ticonderoga graphite. The powdered mixture may be readily formed into pellets without the aid of a binder inasmuch as the graphite serves this purpose.

Another suitable mixture consists of 40% borosilicate glass, 40% magnesium borate glass and 20% graphite.

In general, we have had success with mixtures of glass and graphite containing from 10 to 60% of the latter.

Metals, such as copper or bronze, may be mixed with the graphite to improve the thermal conductivity, thereby causing the plug to run somewhat cooler in the engine. The metal also, of course, increases the electrical conductivity of the sealing material.

Another example of satisfactory sealing material consists of 50% magnesium borate glass, 25% boron nitride and 25% tungsten carbide. While this material proved satisfactory, it is of somewhat higher cost.

The sealing material is not restricted in its utility to the specific use illustrated. Thus the sealing composition may be used in bonding the insulator in the shell shown at 40 in Figure 2 of the drawings, the bonding material being indicated at 42. In this use it will take the place of the usual copper gasket. Various other applications of the material will occur to those skilled in the art.

The terms "fused" and "fusion" as used in the claims have reference not only to cases of actual conversion of the glass to a liquid, but also to all stages of plasticity preceding the true liquid state. It is understood, of course, that the graphite component is not softened or fused by the heat treatment.

We claim:

1. The method of securing together heat resistant bodies having different coefficients of expansion which consists in preparing a pulverized mixture of glass and graphite, applying the mixture to the bodies in position to form a joint therebetween, and heating the material to fusion causing it to unite with said bodies and form a durable bond.

2. The method of securing together porcelain-like bodies and metal bodies which consists in preparing a pulverized mixture of glass and Madagascar or Ticonderoga flake graphite, applying the mixture to the bodies in position to form a joint therebetween and heating the material to fusion to cause it to unite them and form a durable bond.

3. The method of sealing the insulator of a spark plug to a cooperating metal part which consists in inserting a fusible mixture of glass and graphite between the parts, and heating the material to fusion to form a leak-proof bond.

4. The method of sealing a center wire in a spark plug insulator or the like which consists in providing a fused mixture of glass and graphite within the bore of an insulator, and advancing the center wire into the bore so as to cause the fused material to flow into the space around the wire whereby, upon cooling, the electrode is gripped in place and the bore is sealed.

5. In the method as claimed in claim 13, said electrode and the bore of the insulator having interfitting threads and said electrode being advanced into the bore by engagement of said threads causing the fused material to enter the space between the threads.

6. In insulators for spark plugs an assembly of insulator and conductor embodying an electrically conducting glass seal.

7. An electrical insulator provided with a hole to receive an electrical conductor one component part of which is composed of glass-bonded electrically conducting particles.

8. A spark plug insulator having a center electrode comprising in part a fused mixture of glass and graphite.

9. A spark plug insulator having a center electrode secured in the insulator by a fused mixture of ceramic material and electrically conducting material forming a gas-tight bond with the electrode and the insulator.

10. A spark plug insulator having a bore therein, an electrode in the bore, and sealing material between the electrode and the bore comprising a fused mixture of glass and graphite bonded to the insulator and having a gas-tight union with the electrode.

11. The method of sealing a conductor in an insulator which consists in providing a recess in the insulator, placing in the recess a mixture of pulverized fusible ceramic material and graphite, inserting the electrode in the recess, and heating the mixture until it becomes plastic and forms on cooling a gas-tight union with the material of the insulator and of the electrode.

12. The method of sealing a conductor in the insulator which consists in providing a recess in the insulator, placing in the recess a mixture of pulverized fusible ceramic material and graphite, heating the mixture until it becomes plastic and advancing the electrode into the recess, forcing the plastic material into intimate contact with the insulator and the electrode so that on cooling it forms a gas-tight union therewith.

13. An electrical insulator having a recess therein, an electrical conductor in the recess, and sealing material between the electrode and the recess comprising a fused mixture of glass and graphite bonded to the insulator and having a gas-tight union with the electrode.

14. A spark plug insulator having a bore therein, an electrode in the bore, and sealing material between the electrode and the bore comprising a fused mixture of borate glass having a low coefficient of expansion and graphite bonded to the insulator and having a gas-tight union with the electrode.

KARL SCHWARTZWALDER.
WILLIAM SHUFORD KIRK.

CERTIFICATE OF CORRECTION.

Patent No. 2,106,578. January 25, 1938.

KARL SCHWARTZWALDER, ET AL.

It is hereby certified that error appears in the printed specification of the above numbered patent requiring correction as follows: Page 2, second column, line 50, claim 5, for the claim reference numeral "13" read 4; and that the said Letters Patent should be read with this correction therein that the same may conform to the record of the case in the Patent Office.

Signed and sealed this 8th day of March, A. D. 1938.

Henry Van Arsdale,
Acting Commissioner of Patents.

(Seal)